United States Patent
Xie et al.

(10) Patent No.: US 10,053,368 B1
(45) Date of Patent: Aug. 21, 2018

(54) SYNTHESIS OF AFX FRAMEWORK TYPE MOLECULAR SIEVES

(71) Applicant: Chevron U.S.A. Inc., San Ramon, CA (US)

(72) Inventors: Dan Xie, Richmond, CA (US); Kurt Owen Jensen, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/697,777

(22) Filed: Sep. 7, 2017

(51) Int. Cl.
*C01B 39/48* (2006.01)
*B01J 29/70* (2006.01)

(52) U.S. Cl.
CPC .............. *C01B 39/48* (2013.01); *B01J 29/70* (2013.01)

(58) Field of Classification Search
CPC .................................. C01B 39/48; B01J 29/70
See application file for complete search history.

(56) References Cited

U.S. PATENT DOCUMENTS

| | | | | |
|---|---|---|---|---|
| 4,508,837 | A * | 4/1985 | Zones | B01J 29/04 423/326 |
| 5,194,235 | A | 3/1993 | Zones | |
| 5,370,851 | A | 12/1994 | Wilson | |
| 8,562,942 | B2 | 10/2013 | Archer et al. | |
| 9,868,643 | B2 * | 1/2018 | Elomari | C01B 39/48 |
| 9,908,108 | B2 * | 3/2018 | Davis | B01J 29/70 |
| 2016/0137518 | A1 | 5/2016 | Rivas-Cardona et al. | |
| 2017/0348678 | A1 * | 12/2017 | Davis | B01J 29/70 |

OTHER PUBLICATIONS

Jackowski et al, "Diquanternary Ammonium Compounds in Zeolite Synthesis: Cyclic and Polycyclic N-Heterocycles Connected by Methylene Chains" JACS 2009 pp. 1092-1100 (Year: 2009).*
Maple et al, "Synthesis and Characterization of aluminophosphate-based zeotype materials prepared with a,w-bis(N-methylpyrrolidinium)alkane cations as structure-directing agents", Dalton Transactions, (2007) pp. 4175-4181. (Year: 2007).*
R.F. Lobo, S.I. Zones and R.C. Medrud "Synthesis and Rietveld Refinement of the Small-Pore Zeolite SSZ-16"Chem. Mater. 1996, 8, 2409-2411.
M.J. Maple and C.D. Williams "Synthesis and characterisation of aluminophosphate-based zeotype materials prepared with a,w-bis(N-methylpyrrolidinium)alkane cations as structure-directing agents" Dalton Trans. 2007, 4175-4181.
A. Jackowski, S.I. Zones, S-J. Hwang and A.W. Burton "Diquaternary Ammonium Compounds in Zeolite Synthesis: Cyclic and Polycyclic N-Heterocycles Connected by Methylene Chains" J. Am. Chem. Soc. 2009, 131, 1092-1100.
N. Martin, C. Paris, P.N.R. Vennestrom, J.R. Thogersen, M. Moliner and A. Corma "Cage-based small-pore catalysts for NH3-SCR prepared by combining bulky organic structure directing agents with modified zeolites as reagents" Appl. Catal. B: Environ. 2017, 217, 125-136.

* cited by examiner

*Primary Examiner* — David M Brunsman
(74) *Attorney, Agent, or Firm* — Terrence M. Flaherty

(57) ABSTRACT

A method is provided for the synthesis of AFX framework type molecular sieves using a structure directing agent selected from one or more of hexamethonium dications, 1,6-bis(N-methylpyrrolidinium)hexane dications, and 1,4-bis(N-methylpyrrolidinium)butane dications.

7 Claims, 2 Drawing Sheets

Two-Theta (deg)

SYNTHESIS OF AFX FRAMEWORK TYPE MOLECULAR SIEVES

TECHNICAL FIELD

This disclosure relates to the synthesis of AFX framework type molecular sieves.

BACKGROUND

Because of their unique sieving characteristics as well as their catalytic properties, crystalline molecular sieves and zeolites are especially useful in applications such as hydrocarbon conversion, gas drying and separation.

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three-letter code and are described in the "*Atlas of Zeolite Framework Types*," Sixth Revised Edition, Elsevier (2007).

One known molecular sieve for which a structure has been established is the material designated as AFX, which is a molecular sieve having pores defined by intersecting channels formed by 8-membered rings of tetrahedrally coordinated atoms and which have cross-sectional dimensions of about 3.4 Å by about 3.6 Å. Examples of AFX framework type molecular sieves include SAPO-56 and SSZ-16. AFX framework type molecular sieves can be potentially useful in sorptive separations, for example of methane from carbon dioxide, and in catalyzing chemical reactions, including the conversion of oxygenates to olefins (OTO) and the selective reduction of $NO_x$ in combustion exhaust gases, where small pore size is desirable.

U.S. Pat. No. 4,508,837 discloses zeolite SSZ-16 and its synthesis in the presence of an organic nitrogen-containing species derived from 1,4-di(1-azoniabicyclo[2.2.2]octane) lower alkane compounds.

U.S. Pat. No. 5,194,235 discloses the synthesis of zeolite SSZ-16 from a reaction mixture containing DABCO-$C_n$-diquat cations, where DABCO represents 1,4-diazabicyclo[2.2.2]octane and n is 3, 4, or 5.

U.S. Pat. No. 5,370,851 discloses the synthesis of molecular sieve SAPO-56 from a reaction mixture containing N,N,N'N'-tetramethylhexane-1,6-diamine.

U.S. Pat. No. 8,562,942 disclose the synthesis of an aluminosilicate AFX framework type zeolite using 1,3-bis(1-adamantyl)imidazolium cations as a structure directing agent.

According to the present disclosure, it has now been found that hexamethonium dications, 1,6-bis(N-methylpyrrolidinium)hexane dications, and 1,4-bis(N-methylpyrrolidinium)butane dications can be effective as structure directing agents in the synthesis of AFX framework type molecular sieves.

SUMMARY

In one aspect, there is provided a method of synthesizing a molecular sieve of AFX framework type, the method comprising: (a) preparing a reaction mixture comprising: (1) a source of silicon oxide; (2) a source of aluminum oxide; (3) a source of a Group 1 metal comprising sodium, but substantially no potassium; (4) a structure directing agent comprising one or more of hexamethonium dications, 1,6-bis(N-methylpyrrolidinium)hexane dications, and 1,4-bis(N-methylpyrrolidinium)butane dications; (5) a source of hydroxide ions; and (6) water; and (b) subjecting the reaction mixture to crystallization conditions sufficient to form crystals of the molecular sieve.

In another aspect, there is provided a crystalline molecular sieve of AFX framework type and, in its as-synthesized form, comprising one or more of hexamethonium dications, 1,6-bis(N-methylpyrrolidinium)hexane dications, and 1,4-bis(N-methylpyrrolidinium)butane dications in its pores.

DETAILED DESCRIPTION

Introduction

Figure 1:
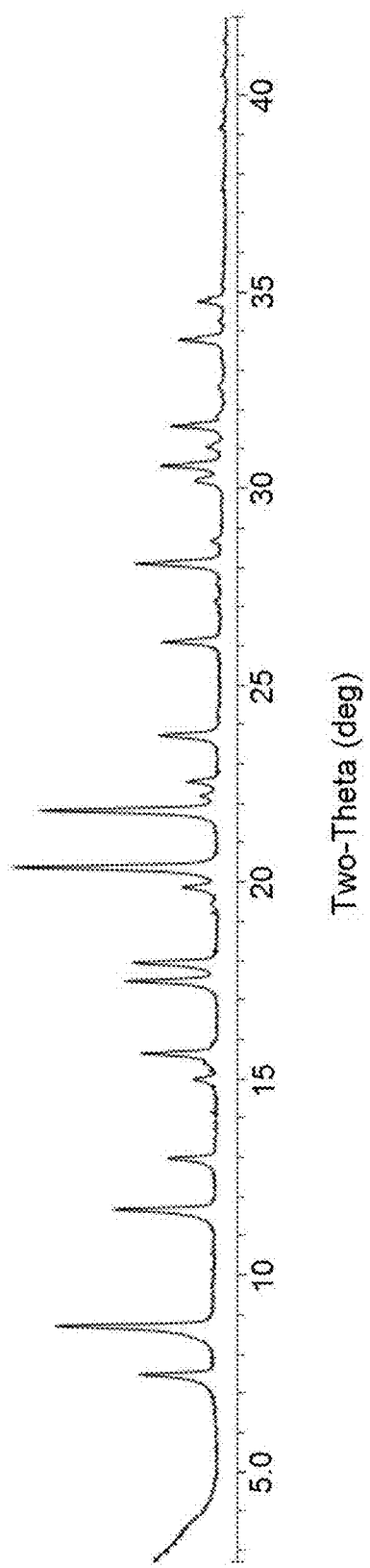
FIG. 1 is a powder X-ray diffraction (XRD) pattern of the as-synthesized molecular sieve prepared in Example 1.

The term "framework type" is used in the sense described in the "Atlas of Zeolite Framework Types," Sixth Revised Edition, Elsevier (2007).

The term "as-synthesized" is employed herein to refer to a molecular sieve in its form after crystallization, prior to removal of the structure directing agent.

The term "anhydrous form" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

In general, the AFX framework type molecular sieve can be synthesized by (a) preparing a reaction mixture comprising (1) a source of silicon oxide; (2) a source of aluminum oxide; (3) a source of a Group 1 metal (M) comprising sodium, but substantially no potassium; (4) a structure directing agent (Q) comprising one or more of hexamethonium dications, 1,6-bis(N-methylpyrrolidinium)hexane dications, and 1,4-bis(N-methylpyrrolidinium)butane dications; (5) a source of hydroxide ions; and (6) water; and (b) subjecting the reaction mixture to crystallization conditions sufficient to form crystals of the molecular sieve.

The composition of the reaction mixture from which the molecular sieve is formed, in terms of molar ratios, is identified in Table 1 below:

TABLE 1

| Reactants | Broad | Exemplary |
|---|---|---|
| $SiO_2/Al_2O_3$ | 5 to 100 | 30 to 80 |
| $M/SiO_2$ | 0.05 to 1.00 | 0.30 to 0.60 |
| $Q/SiO_2$ | 0.05 to 0.50 | 0.05 to 0.20 |
| $OH/SiO_2$ | 0.05 to 1.00 | 0.20 to 0.70 |
| $H_2O/SiO_2$ | 10 to 60 | 15 to 40 |

Suitable sources of silicon oxide include colloidal silica, precipitated silica, fumed silica, alkali metal silicates and tetraalkyl orthosilicates.

Suitable sources of aluminum oxide include hydrated alumina and water-soluble aluminum salts (e.g., aluminum nitrate).

Combined sources of silicon oxide and aluminum oxide can additionally or alternatively be used and can include aluminosilicate zeolites (e.g., zeolite Y) and clays or treated clays (e.g., metakaolin).

The Group 1 metal (M) comprises sodium. The metal (M) is generally present in the reaction mixture as the hydroxide.

In certain aspects, the Group 1 metal (M) can comprise substantially no potassium (e.g., less than 5 wt. % of M can be potassium, such as less than 2.5 wt. %, less than 1 wt. %, less than 0.5 wt. %, less than 0.1 wt. %, less than 0.05 wt. %, or 0 wt. %). Additionally or alternatively, the reaction mixture may comprise no added potassium. Though some potassium may be present as an impurity in one or more of the reaction mixture ingredients, no component is added specifically to introduce potassium to the reaction mixture.

The structure directing agent (Q) comprises one or more of hexamethonium dications, 1,6-bis(N-methylpyrrolidinium)hexane dications, and 1,4-bis(N-methylpyrrolidinium)butane dications represented by the following structures (1), (2) and (3), respectively:

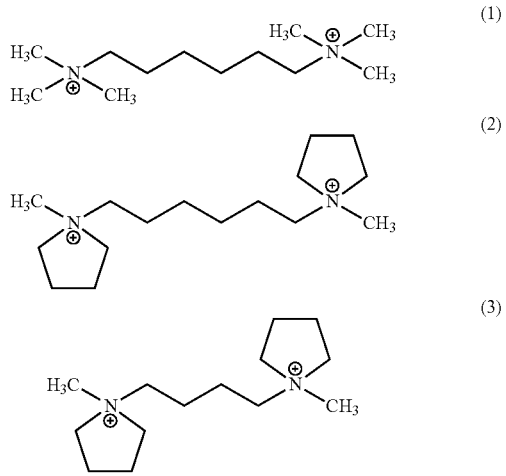

Suitable sources of Q are the hydroxides, chlorides, bromides, and/or other salts of the diquaternary ammonium compound.

The reaction mixture also contains a source of hydroxide ions, for example, sodium hydroxide. Hydroxide can also be present as a counter-ion of the structure directing agent.

The reaction mixture may also contain seeds of a molecular sieve material, such as SSZ-16, desirably in an amount of from 0.01 to 10,000 ppm (e.g., from 100 to 5000 ppm) by weight of the reaction mixture.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the synthesis conditions.

Crystallization and Post-Synthesis Treatment

Crystallization of the molecular sieve from the above reaction mixture can be carried at either static or stirred conditions in a suitable reactor vessel, such as, for example, polypropylene jar or Teflon-lined or stainless steel autoclaves, at a temperature of from 125° C. to 200° C. for a time sufficient for crystallization to occur at the temperature used (e.g., from 10 to 480 hours, or 24 to 240 hours). Crystallization is typically carried out in a closed system under autogenous pressure.

Once the molecular sieve crystals have formed, the solid product is recovered from the reaction mixture by standard mechanical separation techniques such as centrifugation or filtration. The crystals are water-washed and then dried to obtain the as-synthesized molecular sieve crystals. The drying step can be performed at atmospheric pressure or under vacuum. The drying step is typically performed at a temperature of less than 200° C.

As a result of the crystallization process, the recovered crystalline molecular sieve product contains within its pore structure at least a portion of the structure directing agent used in the synthesis.

The as-synthesized molecular sieve prepared as described herein may be subjected to subsequent treatment to remove part or all of the organic structure directing agent used in its synthesis. This can be conveniently effected by thermal treatment in which the as-synthesized material can be heated to a temperature of at least 370° C. for at least 1 minute and generally not longer than 24 hours. While sub-atmospheric and/or super-atmospheric pressures can be employed for the thermal treatment, atmospheric pressure may be desired for reasons of convenience. The thermal treatment can be performed at a temperature up to 925° C. Additionally or alternatively, the organic structure directing agent can be removed by treatment with ozone (see, e.g., A. N. Parikh et al., *Micropor. Mesopor. Mater.* 2004, 76, 17-22).

To the extent desired, the original Group 1 metal cations (e.g., Na+) in the as-synthesized molecular sieve can be replaced in accordance with techniques well known in the art by ion exchange with other cations. Suitable replacing cations include metal ions, hydrogen ions, hydrogen precursor (e.g., ammonium ions), and combinations thereof. Preferred replacing cations may include those which tailor the catalytic activity for certain chemical conversion reactions. These may include hydrogen, rare earth metals, metals of Groups 2-15 of the Periodic Table of Elements.

The present molecular sieve can be formulated into a catalyst composition by combination with other materials, such as binders and/or matrix materials, which provide additional hardness or catalytic activity to the finished catalyst.

Materials which can be blended with the present molecular sieve include various inert or catalytically active materials. These materials include compositions such as kaolin and other clays, various forms of rare earth metals, other non-zeolite catalyst components, zeolite catalyst components, alumina or alumina sol, titania, zirconia, quartz, silica or silica sol, and mixtures thereof. These components are also effective in reducing overall catalyst cost, acting as a thermal sink to assist in heat shielding the catalyst during regeneration, densifying the catalyst and increasing catalyst strength. When blended with such components, the amount of AFX framework type molecular sieve contained in the final catalyst product can range from 1 to 90 wt. % (e.g., 2 to 80 wt. %) of the total catalyst.

Characterization of the Molecular Sieve

In its as-synthesized and anhydrous form, the AFX framework type molecular sieve prepared as described herein has a chemical composition, in terms of molar ratios, as set forth in Table 2:

TABLE 2

|  | Broad | Exemplary |
|---|---|---|
| $SiO_2/Al_2O_3$ | 5 to 50 | 5 to 25 |
| $Q/SiO_2$ | >0 to 0.1 | >0 to 0.1 |
| $M/SiO_2$ | >0 to 0.1 | >0 to 0.1 | wherein Q and M are as described herein above.

It should be noted that the as-synthesized form of the molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

AFX framework type molecular sieves synthesized by the method disclosed herein are characterized by their powder X-ray diffraction pattern. Powder XRD patterns representative of AFX framework type molecular sieves can be referenced in the "Collection of Simulated XRD Powder Patterns for Zeolites," Fifth Revised Edition, Elsevier (2007), published on behalf of the Structure Commission of the International Zeolite Association.

Minor variations in the X-ray diffraction pattern can result from variations in the molar ratios of the framework species of the particular sample due to changes in the lattice constants. In addition, sufficiently small crystals will affect the shape and intensity of peaks, leading to significant peak broadening. Minor variations in the XRD pattern can also result from variations in the organic compound used in the preparation. Calcination can also cause minor shifts in the XRD pattern. Notwithstanding these minor perturbations, the basic crystal lattice remains unchanged.

The powder XRD patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

EXAMPLES

The following illustrative examples are intended to be non-limiting.

Example 1

27.20 g of deionized water, 1.55 g of a 50% NaOH solution, 8.57 g of a 20% hexamethonium hydroxide solution and 3.00 g of CBV760 Y-zeolite powder (Zeolyst International, $SiO_2/Al_2O_3$ molar ratio=60) were mixed together in a Teflon liner. The resulting gel was stirred until it became homogeneous. The liner was then capped and placed within a Parr Steel autoclave reactor. The autoclave was then put in an oven heated at 150° C. for 3 days. The solid products were recovered from the cooled reactor by centrifugation, washed with deionized water and dried at 95° C.

Figure 2:
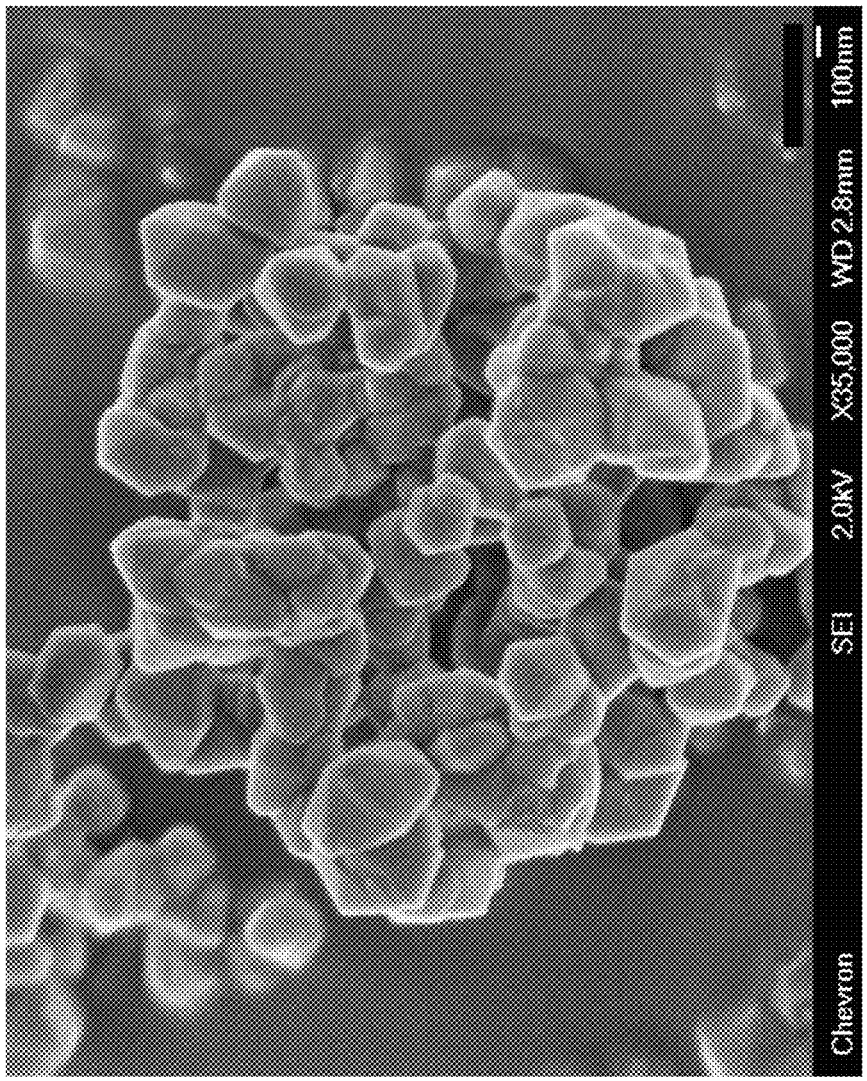
FIG. 2 is a scanning electron micrograph (SEM) image of the as-synthesized molecular sieve prepared in Example 1.

The product was analyzed by powder XRD and SEM. The powder XRD pattern in FIG. 1 is consistent with the product being pure AFX framework type molecular sieve. The SEM image in FIG. 2 indicates a uniform field of crystals.

The product had a $SiO_2/Al_2O_3$ molar ratio of 12.55, as determined by ICP elemental analysis.

Example 2

5.23 g of deionized water, 0.39 g of a 50% NaOH solution, 0.48 g of a 20% hexamethonium hydroxide solution and 0.50 g of CBV760 Y-zeolite powder (Zeolyst International, $SiO_2/Al_2O_3$ molar ratio=60) were mixed together in a Teflon liner. The resulting gel was stirred until it became homogeneous. The liner was then capped and placed within a Parr Steel autoclave reactor. The autoclave was then put in an oven heated at 150° C. for 3 days. The solid products were recovered from the cooled reactor by centrifugation, washed with deionized water and dried at 95° C.

Powder XRD indicated that the product was a pure AFX framework type molecular sieve.

The product had a $SiO_2/Al_2O_3$ molar ratio of 11.91, as determined by ICP elemental analysis.

Example 3

10.46 g of deionized water, 0.77 g of a 50% NaOH solution, 0.95 g of a 20% hexamethonium hydroxide solution and 1.00 g of CBV780 Y-zeolite powder (Zeolyst International, $SiO_2/Al_2O_3$ molar ratio=80) were mixed together in a Teflon liner. The resulting gel was stirred until it became homogeneous. The liner was then capped and placed within a Parr Steel autoclave reactor. The autoclave was then put in an oven heated at 150° C. for 3 days. The solid products were recovered from the cooled reactor by centrifugation, washed with deionized water and dried at 95° C.

Powder XRD indicated that the product was a pure AFX framework type molecular sieve.

The product had a $SiO_2/Al_2O_3$ molar ratio of 13.11, as determined by ICP elemental analysis.

Example 4

4.56 g of deionized water, 0.19 g of a 50% NaOH solution, 1.43 g of a 20% hexamethonium hydroxide solution and 0.50 g of CBV720 Y-zeolite powder (Zeolyst International, $SiO_2/Al_2O_3$ molar ratio=30) were mixed together in a Teflon liner. The resulting gel was stirred until it became homogeneous. The liner was then capped and placed within a Parr Steel autoclave reactor. The autoclave was then put in an oven heated at 150° C. for 3 days. The solid products were recovered from the cooled reactor by centrifugation, washed with deionized water and dried at 95° C.

Powder XRD indicated that the product was a pure AFX framework type molecular sieve.

The product had a $SiO_2/Al_2O_3$ molar ratio of 11.24, as determined by ICP elemental analysis.

Example 5

The as-synthesized molecular sieve of Example 1 was calcined inside a muffle furnace under a flow of air heated to 540° C. at a rate of 1° C./min and held at 540° C. for five hours and cooled to ambient temperature.

The micropore volume of the calcined product was measured using nitrogen physisorption and the data analyzed with the B.E.T. method. The determined micropore volume was 0.23 cm$^3$/g.

Example 6

4.55 g of deionized water, 0.16 g of a 50% NaOH solution, 0.05 g of a 45% KOH solution, 1.43 g of a 20% hexamethonium hydroxide solution and 0.50 g of CBV760 Y-zeolite powder (Zeolyst International, $SiO_2/Al_2O_3$ molar ratio=60) were mixed together in a Teflon liner. The resulting gel was stirred until it became homogeneous. The liner was then capped and placed within a Parr Steel autoclave reactor. The autoclave was then put in an oven heated at 150°

C. for 3 days. The solid products were recovered from the cooled reactor by centrifugation, washed with deionized water and dried at 95° C.

Powder XRD indicated that the product was a pure ERI framework type molecular sieve.

Example 7

25.88 g of deionized water, 1.16 g of a 50% NaOH solution, 10.46 g of a 20% 1,6-bis(N-methylpyrrolidinium) hexane hydroxide solution and 3.00 g of CBV760 Y-zeolite powder (Zeolyst International, $SiO_2/Al_2O_3$ molar ratio=60) were mixed together in a Teflon liner. The resulting gel was stirred until it became homogeneous. The liner was then capped and placed within a Parr Steel autoclave reactor. The autoclave was then put in an oven heated at 150° C. for 4 days. The solid products were recovered from the cooled reactor by centrifugation, washed with deionized water and dried at 95° C.

Powder XRD indicated that the product was a pure AFX framework type molecular sieve.

The product had a $SiO_2/Al_2O_3$ molar ratio of 13.91, as determined by ICP elemental analysis.

Example 8

30.87 g of deionized water, 2.32 g of a 50% NaOH solution, 3.49 g of a 20% 1,6-bis(N-methylpyrrolidinium) hexane hydroxide solution and 3.00 g of CBV760 Y-zeolite powder (Zeolyst International, $SiO_2/Al_2O_3$ molar ratio=60) were mixed together in a Teflon liner. The resulting gel was stirred until it became homogeneous. The liner was then capped and placed within a Parr Steel autoclave reactor. The autoclave was then put in an oven heated at 150° C. for 3 days. The solid products were recovered from the cooled reactor by centrifugation, washed with deionized water and dried at 95° C.

Powder XRD indicated that the product was a pure AFX framework type molecular sieve.

The product had a $SiO_2/Al_2O_3$ molar ratio of 13.05, as determined by ICP elemental analysis.

Example 9

20.76 g of deionized water, 1.55 g of a 50% NaOH solution, 2.10 g of a 20% 1,4-bis(N-methylpyrrolidinium) butane hydroxide solution and 2.00 g of CBV760 Y-zeolite powder (Zeolyst International, $SiO_2/Al_2O_3$ molar ratio=60) were mixed together in a Teflon liner. The resulting gel was stirred until it became homogeneous. The liner was then capped and placed within a Parr Steel autoclave reactor. The autoclave was then put in an oven heated at 150° C. for 3 days. The solid products were recovered from the cooled reactor by centrifugation, washed with deionized water and dried at 95° C.

Powder XRD indicated that the product was a pure AFX framework type molecular sieve.

The product had a $SiO_2/Al_2O_3$ molar ratio of 12.23, as determined by ICP elemental analysis.

The invention claimed is:

1. A method of synthesizing a molecular sieve of AFX framework type, the method comprising:
   (a) preparing a reaction mixture comprising:
      (1) a source of silicon oxide;
      (2) a source of aluminum oxide;
      (3) a source of a Group 1 metal (M) comprising sodium, but substantially no potassium;
      (4) a structure directing agent (Q) comprising one or more of hexamethonium dications, 1,6-bis(N-methylpyrrolidinium)hexane dications, and 1,4-bis(N-methylpyrrolidinium)butane dications;
      (5) a source of hydroxide ions; and
      (6) water; and
   (b) subjecting the reaction mixture to crystallization conditions sufficient to form crystals of the molecular sieve.

2. The method of claim 1, wherein the reaction mixture has a composition, in terms of molar ratios, as follows:

| | |
|---|---|
| $SiO_2/Al_2O_3$ | 5 to 100 |
| $M/SiO_2$ | 0.05 to 1.00 |
| $Q/SiO_2$ | 0.05 to 0.50 |
| $OH/SiO_2$ | 0.05 to 1.00 |
| $H_2O/SiO_2$ | 10 to 60. |

3. The method of claim 1, wherein the reaction mixture has a composition, in terms of molar ratios, as follows:

| | |
|---|---|
| $SiO_2/Al_2O_3$ | 30 to 80 |
| $M/SiO_2$ | 0.30 to 0.60 |
| $Q/SiO_2$ | 0.05 to 0.20 |
| $OH/SiO_2$ | 0.20 to 0.70 |
| $H_2O/SiO_2$ | 15 to 40. |

4. The method of claim 1, wherein the crystallization conditions include a temperature of from 125° C. to 200° C.

5. A molecular sieve of AFX framework type and, in its as-synthesized form, comprising one or more of hexamethonium dications, 1,6-bis(N-methylpyrrolidinium)hexane dications, and 1,4-bis(N-methylpyrrolidinium)butane dications in its pores.

6. The molecular sieve of claim 5, having a $SiO_2/Al_2O_3$ molar ratio in a range of from 5 to 50.

7. The molecular sieve of claim 5, having a $SiO_2/Al_2O_3$ molar ratio in a range of from 5 to 25.

* * * * *